a2

United States Patent
Dyer et al.

(10) Patent No.: US 12,038,951 B2
(45) Date of Patent: Jul. 16, 2024

(54) MAP ITEM CLUSTER CONTROL

(71) Applicants: Douglas M. Dyer, Melbourne, FL (US); Verner Keith Devlin, Melbourne, FL (US); William R. Smith, Melbourne, FL (US)

(72) Inventors: Douglas M. Dyer, Melbourne, FL (US); Verner Keith Devlin, Melbourne, FL (US); William R. Smith, Melbourne, FL (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 187 days.

(21) Appl. No.: 17/858,237

(22) Filed: Jul. 6, 2022

(65) Prior Publication Data
US 2024/0095263 A1    Mar. 21, 2024

(51) Int. Cl.
*G06F 16/29* (2019.01)
*G06F 16/28* (2019.01)

(52) U.S. Cl.
CPC ............ *G06F 16/29* (2019.01); *G06F 16/287* (2019.01)

(58) Field of Classification Search
None
See application file for complete search history.

(56) References Cited

U.S. PATENT DOCUMENTS

| | | | |
|---|---|---|---|
| 8,671,355 B2 | 3/2014 | Pegg et al. | |
| 9,441,970 B2 | 9/2016 | Spindler et al. | |
| 9,927,951 B2 | 3/2018 | Gatter et al. | |
| 10,025,978 B2 | 7/2018 | Roy et al. | |
| 11,169,658 B2 | 11/2021 | Al Majid et al. | |
| 2008/0027632 A1* | 1/2008 | Mauderer | G01C 21/26 701/532 |
| 2009/0271400 A1* | 10/2009 | Uchida | G01C 21/3811 707/999.005 |
| 2009/0327071 A1* | 12/2009 | Kreft | G06F 16/252 715/810 |
| 2014/0005860 A1* | 1/2014 | Chance | B60Q 1/2615 701/2 |
| 2016/0267149 A1 | 9/2016 | Park et al. | |
| 2017/0357423 A1 | 12/2017 | O'Brien et al. | |

(Continued)

OTHER PUBLICATIONS

WOISR: Written Opinion and International Search Report for corresponding PCT/US2023/024451, mailed Sep. 28, 2023.

*Primary Examiner* — Richard L Bowen
(74) *Attorney, Agent, or Firm* — Tarolli, Sundheim, Covell & Tummino LLP

(57) ABSTRACT

A map control module receives a stream of map data characterizing a geographic region proximal to a vehicle and outputs a moving map, and the moving map is divisible into a matrix of cells. A map item control receives a stream of point of interest (POI) data characterizing a plurality of POIs within the boundary and categorizes each of the plurality of POIs to define a set of categories. The map item control determines a display location of a map item within the matrix of cells for each of the plurality of POIs and determines an importance for each POI within a same category. The map item control forms a set of clusters of map items. Each map item in a given cluster of map items has a same cell and a same category. The map item control selects a top-item for each cluster of map items.

18 Claims, 13 Drawing Sheets

(56) References Cited

U.S. PATENT DOCUMENTS

2020/0117339 A1    4/2020  Amitay et al.
2020/0282832 A1*   9/2020  Watanabe ................ H04N 5/74
2021/0357103 A1   11/2021  Kato et al.

* cited by examiner

MAP ITEM CLUSTER CONTROL

TECHNICAL FIELD

The present disclosure relates to a moving map. More particularly, this disclosure relates to clustering map items in the moving map.

BACKGROUND

A moving map display is a type of navigation system output that, instead of numerically displaying the current geographical coordinates determined by the navigation unit or a heading and distance indication of a certain waypoint, displays the unit's current location near a center of a map. As the unit moves around and new coordinates are therefore determined, the moving map moves to keep the unit's position near the center of the display. In a moving map a symbol, such as an icon representing the location of a navigation device carried in a vehicle remains stationary on the display screen while a map or chart image moves beneath the symbol. The display thus portrays the physical movement of the vehicle on the displayed map or chart. The portrayal typically shows a simulated two-dimensional (2D) overhead view of the vehicle location on the moving map, but some devices also simulate a three-dimensional (3D) view from the perspective of the device. Some moving map display systems also provide a method of displaying an elevation of the vehicle above sea level or the earth's surface.

Many vehicles (e.g., aircraft and terrestrial vehicles) employ a moving map to illustrate top-down tactical information. In an aircraft, a moving map may be rotated in a heading-up, track-up or north-up fashion. In a heading-up orientation, the moving map is rotated such that the aircraft heading angle is located at the top of a display. Likewise, in a track-up orientation the moving map is rotated such that the aircraft track compass angle is located at the top of the display. In heading-up and track-up orientations, map elements above the center position of the map are in front of the aircraft, while map elements below the center position of the map are behind the aircraft. In a north-up orientation, map elements could be in any orientation depending on the heading of the aircraft relative to north. In a north-up orientation, map elements exhibit a flow of movement from in front of the aircraft to behind the aircraft, which could be oriented in any possible rotation angle depending on the heading of the aircraft.

SUMMARY

One example relates to a non-transitory machine readable medium having machine readable instructions. The machine readable instructions include a map control module that receives a stream of map data characterizing a geographic region proximal to a vehicle and outputs a moving map based on the stream of map data on a display. The moving map is confined by a boundary of the display corresponding to a portion of the geographic region that changes as a function of time. The moving map is divisible into a matrix of cells. The machine readable instructions also include a map item control that receives a stream of point of interest (POI) data characterizing a plurality of POIs within the boundary and categorizes each of the plurality of POIs to define a set of categories. The map item control determines a display location of a map item within the matrix of cells for each of the plurality of POIs and determines an importance for each POI within a same category. The map item control forms a set of clusters of map items. Each map item in a given cluster of map items of the set of clusters of map items has a same cell and a same category. Also, the map item control selects a top-item for each cluster of map items having the same category. The top-item of each respective cluster of map items corresponds to a POI of the plurality of POIs within the corresponding cluster of map items with a greatest importance. The map item control overlays the set of clusters of map items on the moving map. A display location of each cluster of map items in the set of clusters of map items is based on a display location of the top-item of the respective cluster of map items.

Another example relates to a system that includes a memory for storing machine readable instructions and a processing unit with one or more processor cores that access the memory and executes the machine readable instructions. The machine readable instructions include a map control module that receives a stream of map data characterizing a geographic region proximal to a vehicle. The map control module outputs a moving map based on the map data on a display. The moving map is confined by a boundary of the display corresponding to a portion of the geographic region that changes as a function of time. The moving map is divisible into a matrix of cells. The machine readable instructions also include a map item control that receives POI data characterizing a plurality of POIs within the boundary and categorizes each of the plurality of POIs to define a set of categories. The map item control also determines a display location of a map item within the matrix of cells for each of the plurality of POIs and determines an importance for each POI of the plurality of POIs within a same category. The map item control forms a set of clusters of map items. Each map item in a given cluster of map items of the set of clusters of map items has a same cell and a same category. The map item control selects a top-item for each cluster of map items. The top-item of each respective cluster of map items corresponds to a POI of the plurality of POIs within the corresponding cluster of map items with a greatest importance. The map item control overlays a first set of map items for the set of clusters of map items on the moving map. A display location of each map item in the first set of map items is based on a display location of the top-item of each respective cluster of map items, and each map item in the first set of map items includes a cluster tag indicating a number of hidden-items of a respective cluster of map items of the set of clusters of map items. The map item control overlays a second set of map items on the moving map. Each map item in the second set of map items represents a single POI of the plurality of POIs.

Yet another example relates to a method of clustering map items on a display. The method includes receiving, by a map control module operating on a computing platform, a stream of map data characterizing a geographic region proximal to a vehicle. The method also includes outputting, by the map control module, a moving map, based on the map data on a display. The moving map is confined by a boundary of the display corresponding to a portion of the geographic region that changes as a function of time. The moving map is divisible into a matrix of cells. The method includes receiving, by a map item control operating on the computing platform, a stream of POI data characterizing a plurality of POIs within the boundary and categorizing, by the map item control, each of the plurality of POIs to define a set of categories. The method further includes determining, by the map item control, an importance for each of the plurality of POIs within a same category. The method yet further includes forming, by the map item control, a set of clusters of map items. Each map item in a given cluster of map items of the set of clusters of map items has a same cell and a same category. The method includes selecting, by the map item control, a top-item for each respective cluster of map items that corresponds to a POI of the plurality of POIs within the corresponding cluster of map items with a greatest importance. The method also includes overlaying, by the map item control, a first set of map items for the set of clusters of map items on the moving map. A display location of each map item in the first set of map items is based on a display location of the top-item of each respective cluster of map items, and each map item in the first set of map items includes a cluster tag indicating a number of hidden-items of a respective cluster of map items of the set of clusters of map items. The method further includes overlaying, by the map item control, a second set of map items on the moving map, wherein each map item in the second set of map items represents a single POI of the plurality of POIs.

DETAILED DESCRIPTION

Figure 1:
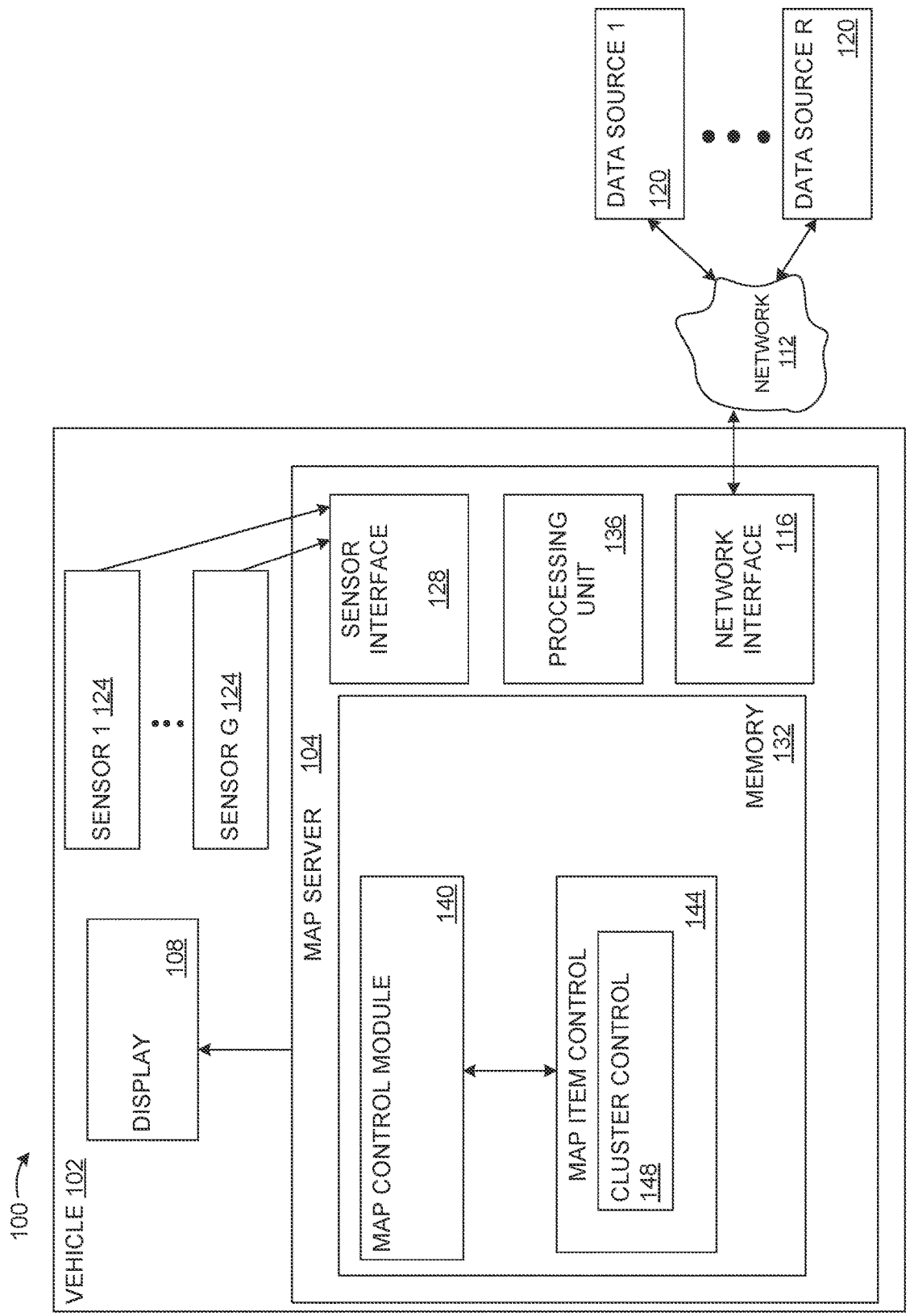
FIG. 1 illustrates an example of a map system for a vehicle.

This description relates to systems and methods for clustering map items (e.g., icons and descriptors) that represent points of interest (POIs) on a moving map. The system can be implemented in a vehicle, such as an aircraft or a terrestrial vehicle, and the moving map assists with navigation. In some examples, the moving map is oriented in a heading-up or track-up fashion, and map items flow from the top of a display downward to a bottom of the display if the vehicle is in motion. In examples where the moving map is oriented in north-up fashion, map elements can be in any orientation depending on the heading of the aircraft relative to north. The POIs on the moving map may be non-stationary (other aircraft, moving vehicles, etc.) and flow in any direction within screen space (alternatively referred to as screen real estate).

Screen space defines the medium where presentation of overlapping data, including icons creates visual ambiguity. Depending on the range-scale presented by a moving map, icons on the moving map, and descriptors corresponding to the icons that are in close geographical proximity may or may-not be visually overlapping. The system executes clustering within the screen space of the moving map presented to the operator of the vehicle (e.g., a pilot) rather than in geographical space. To execute this clustering, the screen space is subdivided into a matrix of cells. For computational efficiency, the matrix dimensions are constant (unchanging) because these dimensions correspond to an unchanging physical screen space. The system can accommodate a re-sizing of the moving map by changing the cell size, but such re-sizing is a relatively infrequent operation. Thus, screen space is fixed by the physical dimensions of the display installed in the vehicle, and the content on the moving map is fluidly moving through and within that screen space. This screen matrix is decomposed into cells that each have the same size. In some examples, cells are rectangular having a width and height tuned a size to enable iconography to not significantly overlap. Any particular screen cell may contain nothing, a single icon (and corresponding description) representing a single POI, or a single top-item for a cluster of map items (or more simply, a cluster). If a cell contains an icon representing a top-item of a cluster, the item will have a cluster tag (e.g., indicia) indicating an ordinal number of hidden-items corresponding to POIs within the cluster that are the same category. If a cell contains an icon representing a single POI (e.g., not a cluster) no such cluster tag is included.

Clustering map items on the moving map curtails visual overlap of map items (e.g., icons and descriptors) to improve readability of the moving map. More particularly, clustering allows proximal map items on the moving map that represent POIs of the same category to be collapsed into clusters when the map items would otherwise visually overlap in screen space. When a cluster of a particular category is formed, one or more POIs corresponding to the cluster will have a greatest importance. If multiple items have the same importance tie breaking is executed whereby the first POI to arrive in the cluster is selected is presumed to have the greatest importance. Thus, the POI with a greatest importance within a cluster of a particular category is selected for visual presentation in the moving map. The map item for the greatest importance POI within a cluster is referred to as the top-item of the cluster. A map-item can include an icon and a description (e.g., a text label). When a cluster is formed, the top-item retains the corresponding icon and label and is associated with a cluster tag (indicia) indicating an ordinal number of the number of hidden-items within the cluster. A map-item containing this cluster tag is recognizable as a top-item, and the cluster tag advertises the number of additional hidden-items that are not visible but reside conceptually below the top-item in screen space. Conversely, a map-item that does not include a cluster-tag is recognizable as a solo-item that represents a single POI. A hidden-item a cluster is not visible and is managed by the system, as each hidden-item may become a solo-item or top-item as content in the moving map changes as a function of time.

FIG. 1 illustrates an example of a map system 100 for a vehicle 102, such as an aircraft or a terrestrial vehicle. The map system 100 can include a map server 104 that can generate output for a display 108. The map server 104 is implemented with a computing platform. In some examples, the display 108 is an output only display. In other examples, the display 108 is an interactive display, such as a touch screen. The display 108 can output, for example, a moving map for a navigation display. In some examples, the output of the display 108 represents a two-dimensional (2D) map. In other examples, the output of the display 108 represents a three-dimensional (3D) map.

The map server 104 is coupled to a network 112 via a utility network interface 116 (e.g., a communication link). The network 112 can be representative of a secure communication channel. R number of data sources 120 communicate on the network 112, where R is an integer greater than or equal to one. Each of the R number of data sources 120 can represent an external (e.g., offboard) source of data, such as another vehicle (e.g., another aircraft, such as a wingman, surveillance aircraft, etc.), a ground station, a server (e.g., a computing platform), a satellite, etc. The R number of data sources 120 provide data, such as real-time data characterizing an environment of operation of the vehicle 102. In some examples, the map server 104 provides similar data to the R number of data sources 120, or some subset thereof.

The vehicle 102 includes G number of sensors 124 installed thereon to detect features of the environment of operation. The G number of sensors 124 are employable to observe, detect, and track various POIs in an area of interest (e.g., a battlespace) of the vehicle 102. The G number of sensors 124 can represent, for example, a receiver for a global navigation satellite system (GNSS), such as the global positioning system (GPS), the GLONASS system, the BeiDou Navigation Satellite System or the Galileo system. Additionally or alternatively, the G number of sensors 124 includes a camera, a radar system, an infrared sensor, a temperature sensor, a proximity sensor, etc. In fact, nearly any sensor that is employable to observe, to detect and/or track POIs in the area of interest of the vehicle 102 is employable in the G number of sensors 124. The G number of sensors 124 communicate with the map server 104 through a sensor interface 128, such as a data bus.

The map server 104 can include memory 132 that stores machine readable instructions. The memory 132 can be implemented as a non-transitory machine readable medium. The memory 132 could be volatile memory (e.g., random access memory), non-volatile memory (e.g., a hard drive, a solid state drive, flash memory, etc.) or a combination thereof. The map server 104 can include a processing unit 136 (e.g., one or more processor cores) that accesses the memory 132 and executes the machine readable instructions.

The memory 132 can store application software for controlling operations of the vehicle 102. For example, the memory 132 can store application software for processing data and controlling the output of the display 108. The map server 104 is representative of one computing platform that is present on the vehicle 102. The map server 104 includes a map control module 140 that controls the display 108. The map control module 140 is configured to process a stream of map data provided from the R number of data sources 120 and/or the G number of sensors 124 (or some subset thereof) to generate a map that is output on the display 108. More particularly, one or more of the R number of data sources 120 can represent a geographical map of a region of the earth (or multiple regions of the earth). More generally, the G number of sensors 124 (or some subset thereof) represent either active or passive sensors for observing the area of interest of the vehicle (e.g., the battlespace). Examples of active sensors would include lidar and radar. Examples of passive sensors would be infrared (IR), and anti-radiation homing (ARH), and electronic warfare support measures (ESM) type sensors. Additionally, in some examples, physical sensors may be offboard (not mounted on the vehicle 102) and provide information about the POIs through the network 112 (e.g., a data link). These off-board sensors are thus represented as one or more of the R number of data sources 120.

The map output on the display 108 can be a moving map, such as a two-dimensional (2D) overhead view moving map (alternatively referred to as a god's eye view map), such as a topological map. Alternatively, the moving map output on the display 108 can represent a first person perspective three-dimensional (3D) map.

Figure 2:
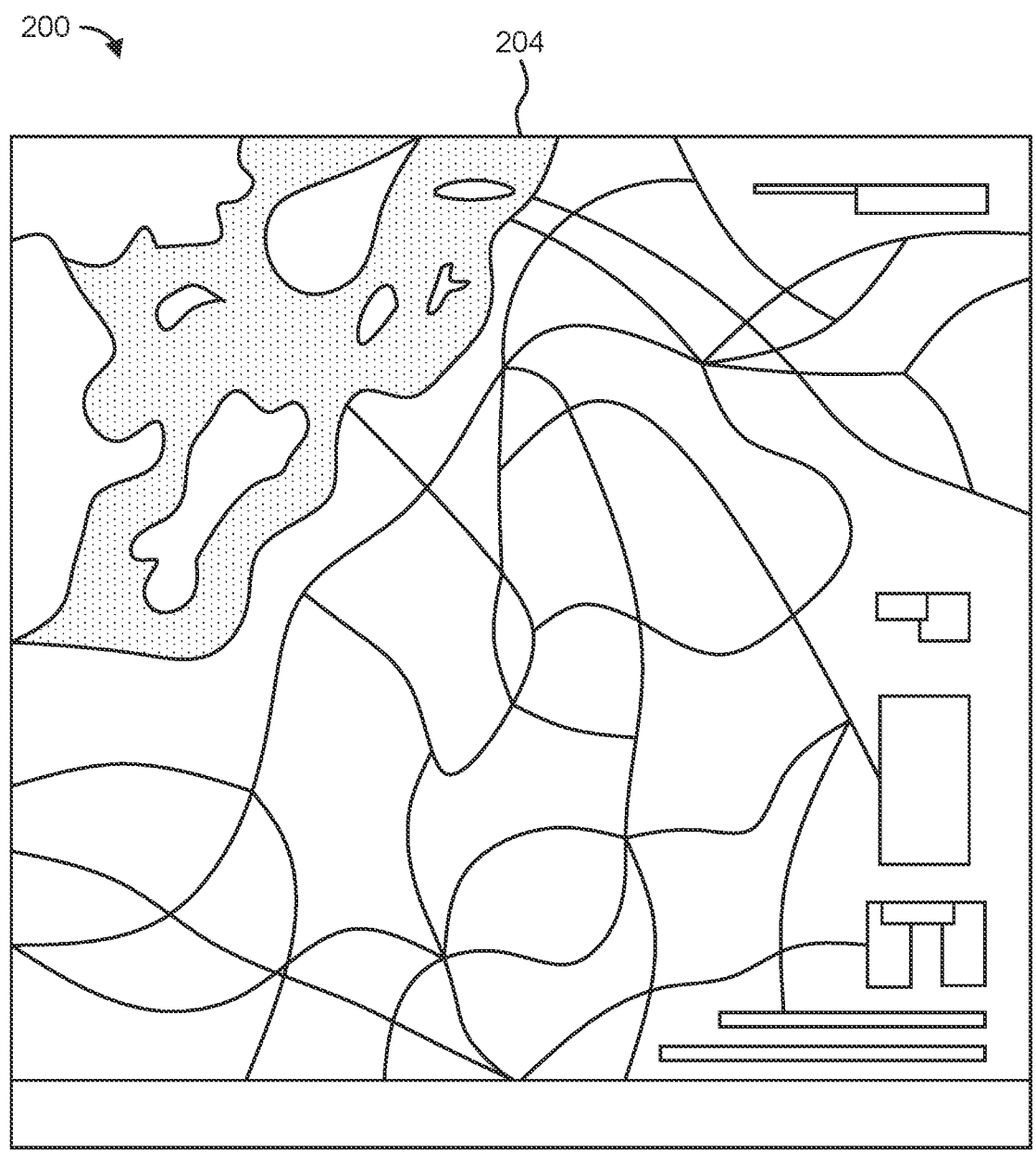
FIG. 2 illustrates a screenshot of an example of a moving map output on a display of a vehicle.

FIG. 2 illustrates a screenshot 200 of an example of a moving map output on display of a vehicle, such as the display 108 of FIG. 1. The screenshot 200 represents a geographical region proximal to the vehicle. The moving map will be updated (e.g., in real-time) as the vehicle moves. As is illustrated the screenshot 200 includes a boundary 204 circumscribing the screenshot 200 of the moving map.

Referring back to FIG. 1, the moving map provided by the map control module 140 changes as a function of time. In many instances, generation of the moving map for output on the display 108 is computationally expensive. Thus, in some instances, data for the moving map is partially processed by an external system that controls one or more of the data sources 120.

The memory 132 also includes a map item control 144. The map item control 144 represents a software module that can overlay items on the moving map output on the display 108. More particularly, the map item control 144 communicates with the map control module 140 to add map items representing points of interest (POIs) onto the moving map with a boundary that defines the limits of the moving map (e.g., the boundary 204 of FIG. 1). Additionally, the map item control 144 determines a display location for each map item corresponding to each respective POI.

The map item control 144 monitors a stream of POI data from the R number of data sources 120 and/or the data from the sensors 124 (or some subset thereof) to identify POIs that are to be represented as map items on the moving map. For each such POI, the map item control 144 determines a category (e.g., flavor) of the respective POI. There is an unlimited number of categories, and the type of categories depends on the type of vehicle 102 employed. For instance, in a situation where the vehicle 102 is a fighter jet, the categories of POIs can be, for example, sorties, such as other aircraft, drones, tanks, surface to air missile systems, transport vehicles, radar vehicles, infantry troops, etc. In examples where the vehicle 102 is a cargo aircraft, the POIs could be, for example, drop points, buildings, airports, etc. In examples where the vehicle 102 is a terrestrial vehicle, such as a civilian vehicle, the categories of POIs can be, for example, other vehicles, restaurants, coffee shops, gas stations, retail stores, etc. Moreover, the lists of categories are not meant to be exhaustive, and in other examples, more ore less categories are included.

The category of each POI can be dynamic based on the stream of POI data provided by one or more of the data sources 120 and/or one or more of the sensors 124. For example, consider a situation where the vehicle 102 is a fighter jet traversing enemy territory. In this situation, a given POI that is determined to initially be a transport vehicle may activate a radar system, and the radar is detected by one of the sensors 124 or one of the data sources 120. Accordingly, the category for the given POI changes from a transport vehicle to a radar vehicle.

The map item control 144 also determines a display location within the moving map for map items corresponding each POI. To make this determination, the map item control 144 divides the moving map in to a 2D matrix of cells, and each POI is situated in a corresponding cell. More generally, the map control module 140 and the map item control 144 are configured to operate in concert to output the moving map on the display 108, and screen space of the moving map is divided into a regular matrix of cells each of which has the same width and height. This matrix is fixed in screen space coordinates of the display 108 and does not change (or rarely changes) for computational efficiency. Each cell of the matrix represents a bin for evaluation of potential clustering. If two or more map items are the same category and are within the same cell, those map items are evaluated by the map item control 144 for potential clustering.

Figure 3:
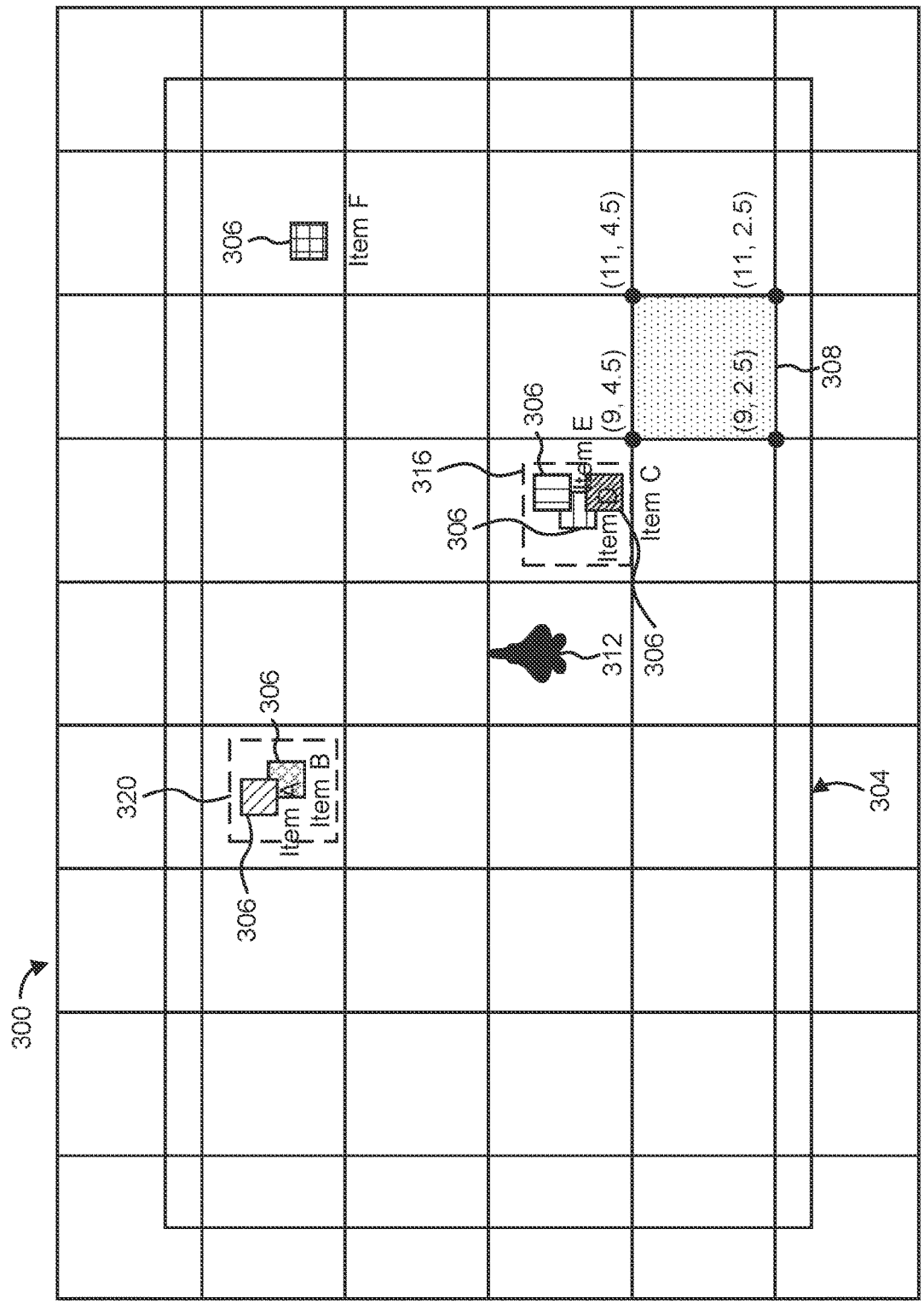
FIG. 3 illustrates a moving map with a boundary and map items.

The cells represent a sub-region of the region represented by the moving map, as illustrated in FIG. 3. More particularly, FIG. 3 illustrates a moving map 300 with a boundary 304 that corresponds to the boundary 204 of FIG. 2. For simplicity, geographic information (e.g., topology) has been removed from the moving map 300. The moving map 300 includes map items 306 that include icons and corresponding descriptors representing different POIs labeled, "Item A" . . . "Item F". The descriptors could, for example, have text identifying a category of the POI. That is, in an example where Item A represents a first tank and Item B represents a second tank, the descriptor could read "Tank 1" (for Item A) and "Tank 2" (for Item B). Additionally, the moving map 300 is divided into a matrix of cells 308 (only one of which is labeled). Each cell 308 represents a sub-region of a region represented by the moving map 300. Each cell 308 has corners that correspond to relative locations on a display (e.g., the display 108 of FIG. 1). The moving map 300 also includes a vehicle icon 312 proximal to a center of the moving map 300 that represents a location of the vehicle relative to other features on the moving map 300. Thus, as the vehicle moves, the location of the vehicle icon 312 remains constant, and the map items 306 representing the POIs move.

As is illustrated in a first box 316 and a second box 320, map items 306 representing POIs that are in close proximity begin to overlap. This overlapping can obfuscate the POIs. Furthermore, in examples where the vehicle is proximal to a hostile target (e.g., an enemy base), there might be one hundreds or more POIs within the geographic region represented by the moving map 300. Thus, the obfuscation gets worse, and can make the moving map 300 virtually unreadable. It is understood that the POIs represented by the map items 306 may or may not be close in terms of geographic proximity. For example, the map items 306 can be significantly separated by altitude or range (depending on the scale of the moving map 300). The proximity addressed herein is related to screen location proximity, which may or may not be related to geographic proximity.

Referring back to FIG. 1, the map item control 144 includes a cluster control module 148. The cluster control module 148 can cluster map items that are the same category and are in the same cell. To cluster map items, the cluster control module 148 assigns an importance to each POI. The importance of each POI is based on an importance of the respective POI relative to the vehicle 102. The importance can be dynamic. For instance, as noted, the vehicle 102 can be a fighter jet. In this situation, the vehicle 102 may be traversing hostile territory, and some of the POIs represent enemy combatants. In this situation, enemy combatants that are actively engaging the vehicle 102 would be given a greater importance than enemy combatants that are not actively engaging the vehicle 102. For instance, suppose that the vehicle 102 is traversing enemy territory, a first POI represents a first tank and a second POI represents a second tank and a third POI represents a third tank. Additionally, suppose that the first tank has a turret aimed away from the vehicle 102 and the second tank has a turret aimed toward the vehicle 102 and the third tank is firing a projectile toward the vehicle 102. In this example, the third tank would have the greatest importance, the second tank would have the second greatest importance and the first tank would have the lowest importance.

As another example, suppose the moving map output by the display 108 is presenting airports as a particular category of information to be clustered. A variety of importance ranking schemes can be envisioned. Airports could be assigned a numerical importance value equal to their longest runway length, or number of runways, or number of terminals, or even an inverse importance equal to the landing queue wait time. Whatever the desired external ranking scheme, a numerical importance value is applied to each airport. When a cluster is formed, the numerical importance values are examined to determine which item has the greatest importance. In the event of a tie, selection can be performed to choose either the oldest item to enter the cluster, or the newest item to enter the cluster. Independent of the mechanism for selecting the POI with the greatest importance, one POI in a cluster is ultimately chosen as the greatest importance and is then selected for visual presentation to the operator (e.g., pilot) as a top-item for the respective cluster.

Additionally, the actions of the POIs can change the importance dynamically. Continuing with the example of the three tanks, suppose that a sensor 124 or a data source 120 detects that the second tank moves its turret in a direction away from the vehicle and the first tank moves it turret toward the vehicle 102. In this situation, the first tank and the second tank would switch importances. The environment of application of the vehicle 102 can impact how an importance of each POI is determined and how the importance changes.

Figure 4:
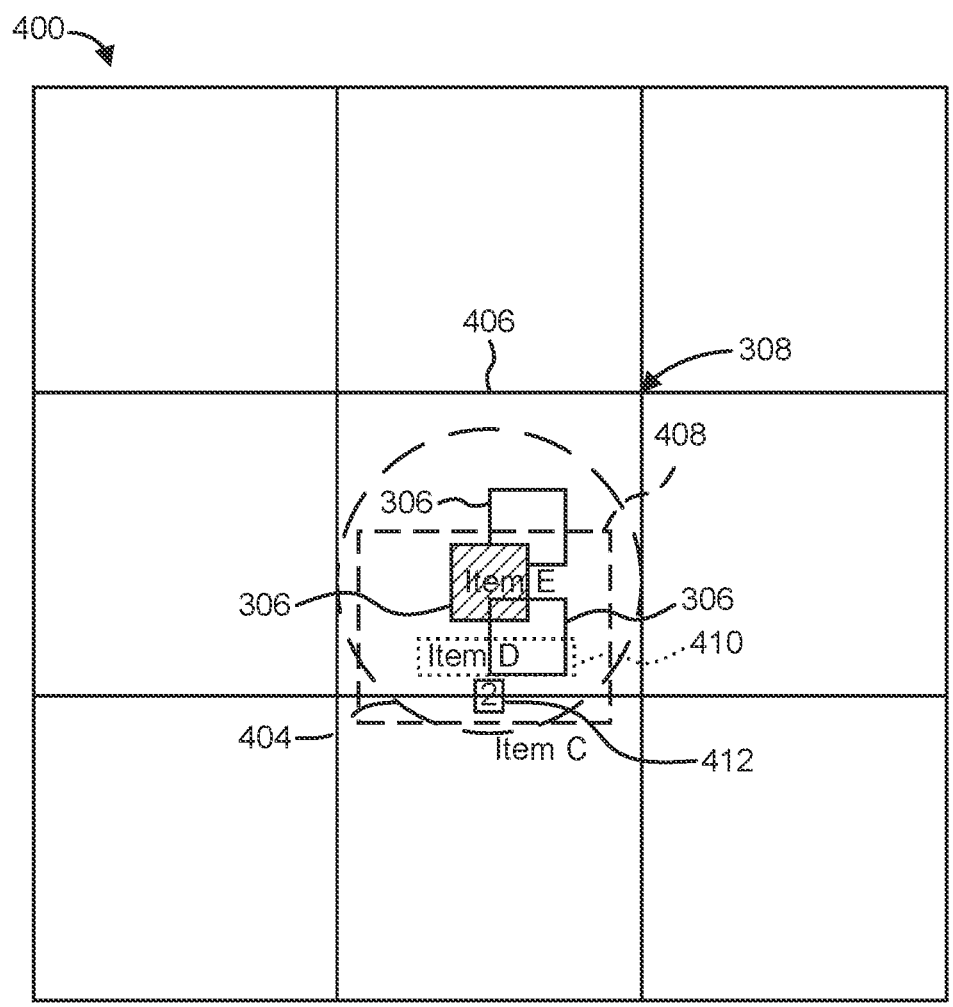
FIG. 4 illustrates a portion of a moving map.

As noted, the cluster control module 148 clusters map items for POIs of the same category and the same cell based on an importance of the POIs. For each category of POI, the cluster control module 148 selects the map item corresponding to the POI with the greatest importance as a top-item for a cluster of map items of the same category that are within a snap distance. The snap distance is a predetermined pixel distance on the display 108. In some examples, the snap distance is a circle with a diameter that is about equal to a leg of a cell (e.g., a length of one leg of the cell 308 of FIG. 3). FIG. 4 illustrates a portion of a moving map 400 (e.g., a portion of the moving map 300 of FIG. 3). Thus, FIGS. 3 and 4 employ the same reference numbers to denote the same structures. In FIG. 4, there are three map items 306, labeled "Item D", "Item C" and "Item E". It is presumed that POIs corresponding to Item D, Item C and Item E have been assigned to the same category. Additionally, it is presumed that Item D has a greater importance than Item C and Item E.

Item E and Item C are within a snap distance 404 of the map item 306 representing Item D. As illustrated, the snap distance 404 is a circle with a diameter equal to a leg 406 of a cell 308. Thus, a cluster control module (e.g., the cluster control module 148 of FIG. 1) can form a cluster 408. The cluster 408 is to be overlaid on a moving map (e.g., the moving map 300 of FIG. 3) as a single map item (e.g., a top-item), a descriptor 410 ("Item D") that identifies a category (e.g., tank 4) of the corresponding POI. The map items 306 are for Item E and Item C are "greyed out" to indicate that these map items 306 are hidden from view (referred to as hidden-items). Further, the cluster 408 includes a cluster tag 412 (e.g., indicia) that identifies a number of hidden-items corresponding to POIs within the cluster. In the present example, the cluster tag 412 is a '2' indicating that there are two hidden-items corresponding to POIs of the same category, namely Item E and Item C within the cluster 408.

As the moving map is updated, as long as the importances remain constant, and Item E and Item C remain within the snap distance 404 of the map item 306 of the POI for Item D, Item E and Item C remain within the cluster 408, even if Item D changes cells and Item E and Item C reside in different cells (potentially).

Figure 5:
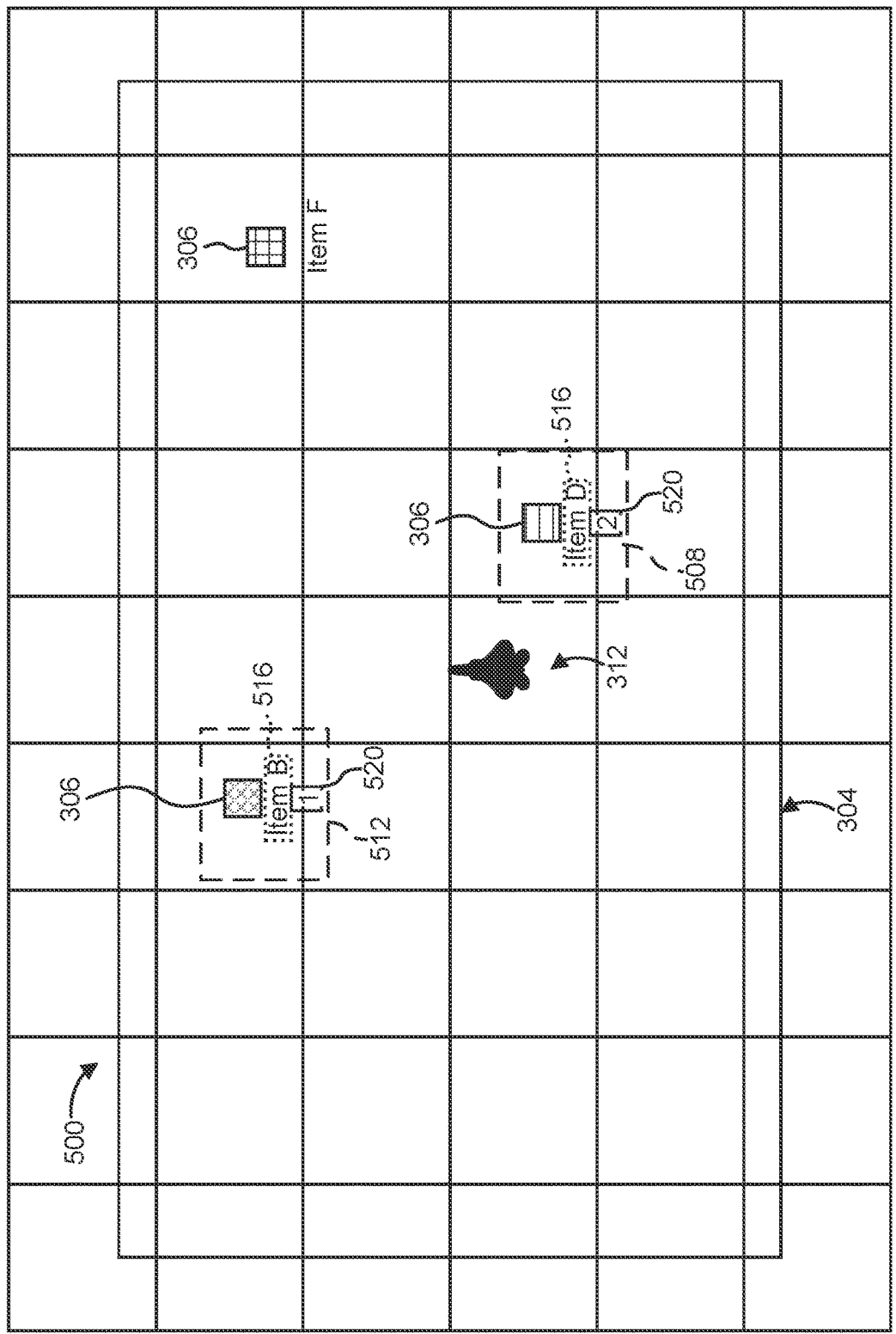
FIG. 5 illustrates a moving map wherein clusters of map items representing points of interest (POIs) have been formed.

Referring back to FIG. 1, as demonstrated in FIG. 4 the map item control 144 employs the cluster control module 148 to cluster map items for POIs that have the same category and (initially) the same cell, such as illustrated in FIG. 4. The resultant clusters of map items are provided to the map control module 140 and included on the moving map output on the display 108. FIG. 5 illustrates a moving map 500 wherein clusters of map items representing POIs have been formed. For simplicity, FIGS. 3 and 5 employ the same reference numbers to denote the same structures.

FIG. 5 illustrates a moving map 500 with the boundary 304 that corresponds to the boundary 204 of FIG. 2. The moving map 500 includes the map items 306 and corresponding descriptors that represent a single POI. The moving map 500 also includes a first cluster 508 and a second cluster 512.

The first cluster 508 and the second cluster 512 are represented with a top-item 306, a corresponding descriptor 516 and an associated cluster tag 520 (e.g., indicia). The descriptor 516 identifies the POI with the greatest importance in the corresponding cluster, namely, "Item D" in the first cluster 508 and "Item B" in the second cluster 512. Also, the cluster tag 520 identifies an ordinal number of hidden-items for POIs that are represented by the first cluster 508 and the second cluster 512, respectively. As compared to the moving map 300 of FIG. 3, the moving map 500 of FIG. 5 is simpler and easier for a reader to process.

Conventional algorithms for implementing clustering are computationally expensive. Conventional clustering solutions require computations that grow exponentially with the number of items. Such strategies involve spatial analysis of distances between each screen item and a statistical identification of clumps (clusters) of overlapping items. On a conventional moving map presented to an aircraft pilot, not only are the map contents visually flowing past the pilot as the vehicle is in motion, items themselves may be in motion causing clusters to form and break apart. Thus, clustering of map items in the manner illustrated in FIG. 5 provides a fluid environment without becoming computationally overwhelming. In particular, to cluster map items 306 in the manner described, there is no need for such statistical analysis to identify the clumps of map items. Instead, as illustrated by the moving map 500, for each such cluster, namely, the first cluster 508 and the second cluster 512, the top-item is selected (Item D and Item B) and the icon for the top-item (with a location already selected on the display) for the cluster is selected to represent the entire cluster. Additionally, the display location of each cluster of map items is simply the display location of the top-item in the cluster of map items. Further, the cluster tag 520 is employable to quickly indicate to a viewer that a particular map item is a cluster. Conversely, map items 306 without a cluster tag 520 (such as the map item 306 for Item F in FIG. 5) are quickly recognized to be representative of a single POI. Accordingly, the moving map 500 provides a computationally inexpensive and visually appealing manner to represent clusters of map items 306.

Referring back to FIG. 1, intermittently, an operator (e.g., a pilot or driver) of the vehicle 102 may desire to see individual items rather than a cluster of items. In some such examples, the map control module 140 can output user controls (e.g., virtual buttons) that if actuated, toggle clustering of map items on and off. Also, in some examples, an individual cluster of map items can be selected (e.g., by touching and/or employing a virtual pointer), and the hidden items of a particular cluster of map items can be revealed.

Additionally, the map item control 144 is configured to continuously monitor the status of the vehicle 102, the R number of data sources 120 and the G number of sensors 124 to update the moving map. In particular, as the vehicle and/or POIs represented as map items on the moving map change locations, the moving map is updated. In some situations, such movement can cause clusters of map items to break.

Figure 6A:
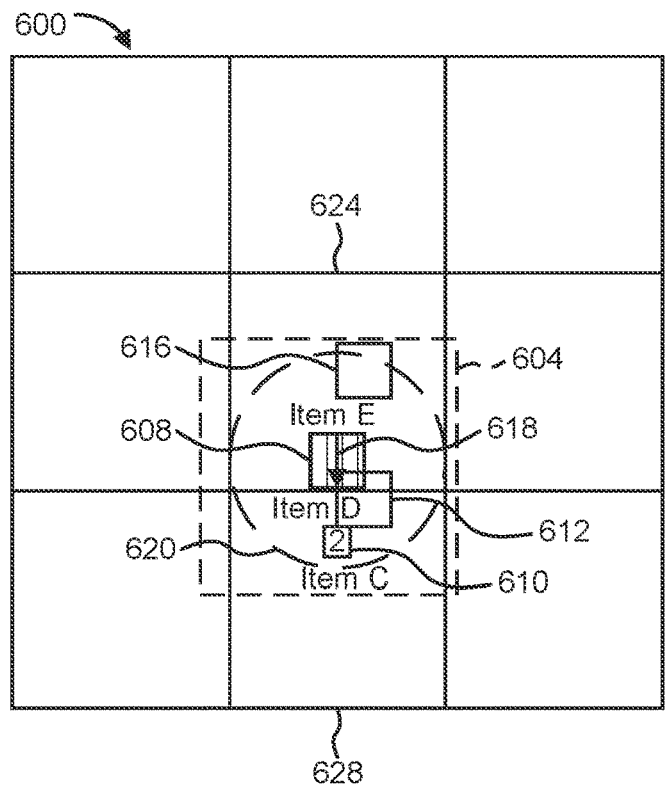
FIG. 6A illustrates a portion of a moving map in a first stage of an animation that includes a cluster of map items.
Figure 6B:
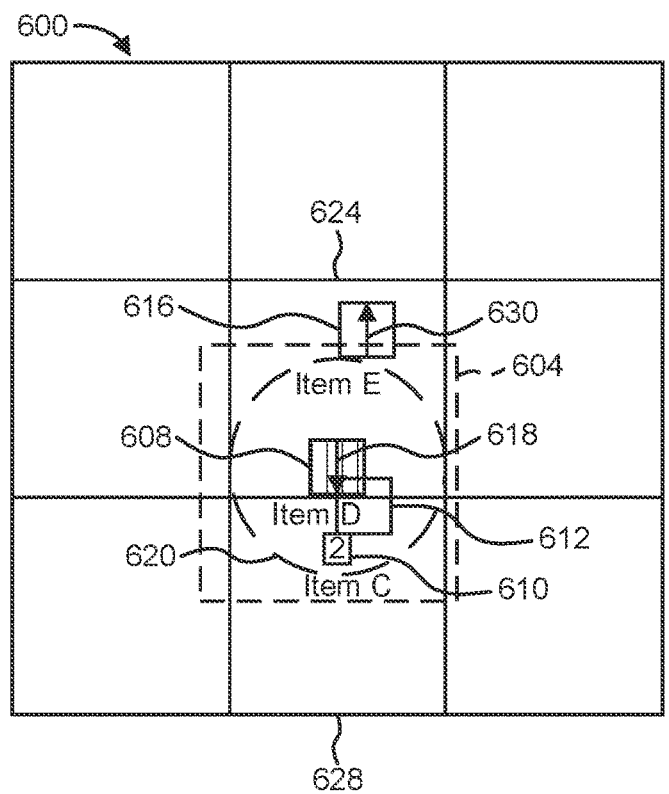
FIG. 6B illustrates the portion of the moving map in a second stage of the animation.
Figure 6C:
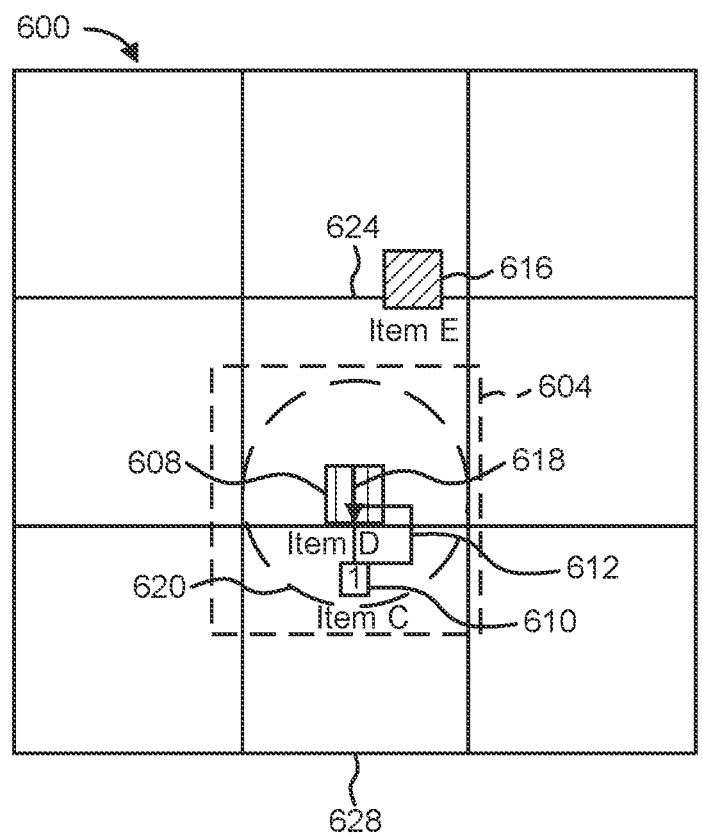
FIG. 6C illustrates the portion of the moving map in a third stage of the animation.

FIGS. 6A, 6B and 6C illustrate an animation of a cluster being broken. The animation can be output on a moving map, such as the moving map 500. Moreover, the animation can be executed by a map item control, such as the map item control 144 of FIG. 1.

FIG. 6A illustrates a portion of a moving map 600 in a first stage of the animation that includes a cluster 604. The cluster 604 includes a top-item 608 (Item D) and a cluster tag 610 with a value of '2', indicating that the cluster 604 has two hidden-items, namely a first hidden-item 612 and a second hidden-item 616 (Item C, and Item E, respectively). The top-item 608 includes an arrow 618 indicating a direction of travel of the top-item 608. The map item 612 (Item C) and the map item 616 are "greyed out" in FIG. 6A, but would be invisible in an output representing the moving map 600. The cluster 604 includes a snap distance 620 that defines a boundary of the cluster 604. Additionally, as is illustrated, the cluster 604 with the snap distance 620 crosses the boundary between a first cell 624 and a second cell 628.

FIG. 6B illustrates the portion of the moving map 600 in a second stage. In FIG. 6B, the second hidden-item 616 moves in a direction indicated by an arrow 630 relative to the top-item 608. However, a point of the second hidden-item 616 is still within the snap distance 620 of the cluster 604. Accordingly, for the situation illustrated in FIG. 6B, the second hidden-item 616 is maintained in the cluster 604 by the map item control.

FIG. 6C illustrates the portion of the moving map 600 in a third stage. In FIG. 6C, the second hidden-item 616 moves outside of the snap distance 620 of the cluster 604. Accordingly, the second hidden-item 616 is converted into a displayed solo map item 616 (representing a single POI), and the cluster tag 610 is decremented by one to reflect the change.

Referring back to FIG. 1, as illustrated in FIGS. 6A-6C in situations where a top-item transitions from one cell into a new cell, the operations provided by the map item control 144 avoids the cluster breaking apart unnecessarily to avoid unneeded distractions on the moving map. A conventional approach employing naïve machine learning techniques would show a cluster breaking apart the moment a top-item moves into a new cell different from the cell that a subordinate hidden-item resides in. Additionally, a conventional naïve approach would show a cluster breaking apart the moment a hidden-item moves into a new cell different from the cell which the superior top-item resides. Accordingly, the conventional approach would have a visual discontinuity. Conversely, as illustrated in FIGS. 6A-6C, this visual discontinuity is avoided by the map item control 144, because hidden-items of are bound to the (visible) top-item of a cluster even in situations where the hidden-items and the top-item are spatially located in different cells of the moving map.

The approach employed by the map control module 140 avoids the visual problems of clusters constantly breaking and reforming as top-items and hidden-items flow across cell boundaries that is common in the conventional approach. In particular, the binding a hidden-item to the top-item of a cluster (as illustrated in FIGS. 5 and 6A-6C) is executed by leveraging a snap distance (e.g., the snap distance 620 of FIGS. 6A-6C) of spatial distance within the display 108. In response to the spatial distance between a subordinate hidden-item and the corresponding top-item exceeding the snap distance, the binding of the subordinate hidden-item to the corresponding top-item is broken. Responsive to this break, the hidden-item can then be re-evaluated with regards to a presentation of the hidden-item within screen space, allowing the hidden-item to become a solo-item if the map item now resides singularly within a particular cell, or join to a new cluster as either a hidden-item or top-item.

As noted, the map item control 144 continuously monitors the R number of data sources 120 and/or the sensors 124 for new and/or changing (e.g., category changing) map items. New and category changing map items are treated in the same manner. Responsive to detecting a new or changing map item, the map control module 140 determines an importance and a screen location for the new or changing map item. The cluster control module 148 considers the new or changing map item for clustering. More particularly, the cluster control module 148 determines if the new or changing map item is to be added to a cluster. Additionally, the cluster control module 148 determines if the display location (or other feature) of the cluster should change based on an importance of the new or changing map item.

Figure 7:
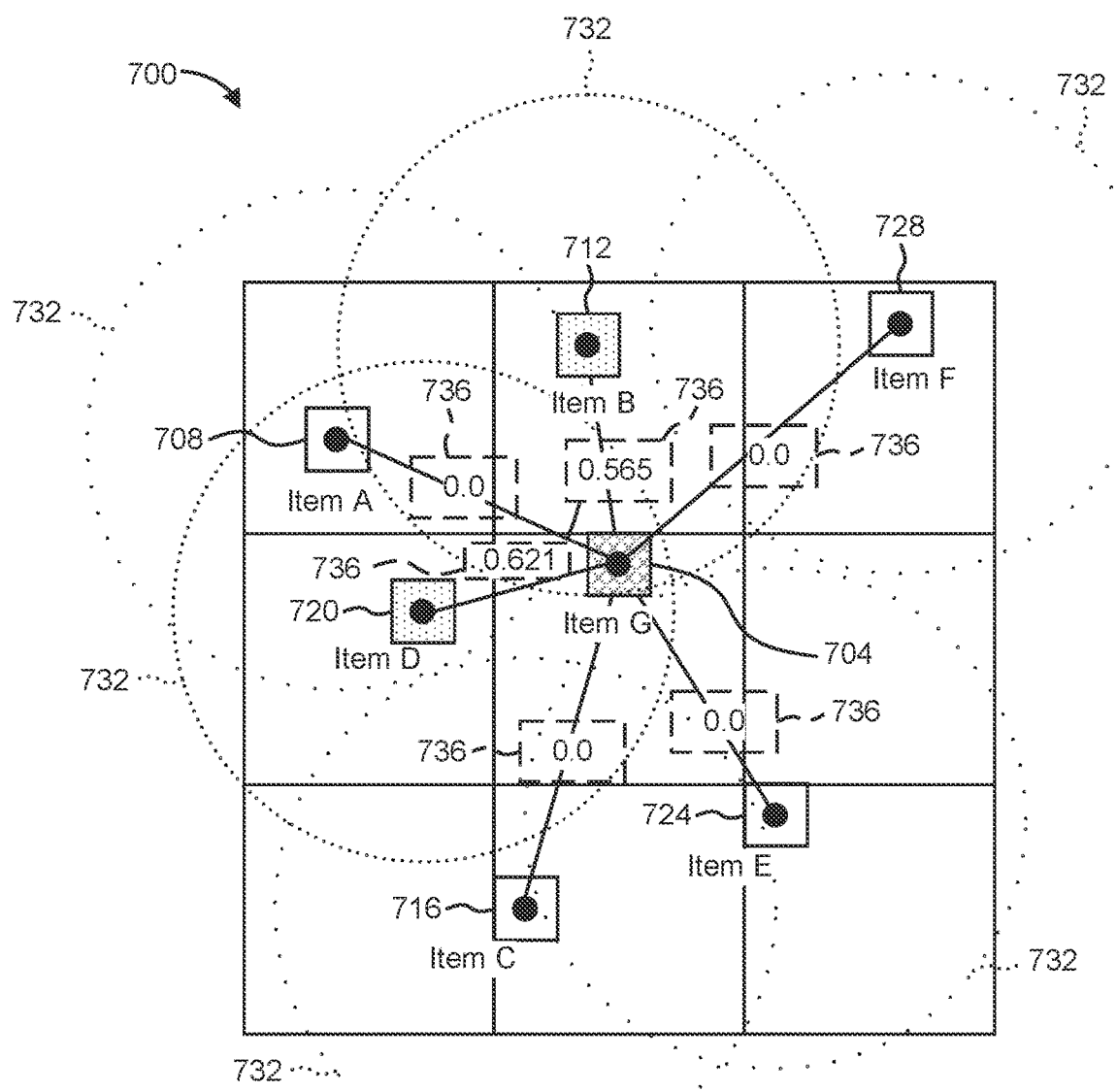
FIG. 7 illustrates a portion of a moving map wherein a map item, representing a new or changing map item, is to be added to the moving map.

FIG. 7 illustrates a portion of a moving map 700, such as a portion of the moving map 500 of FIG. 5, wherein a map item 704 (representing a new or changing map item) that is labeled Item G and the map item 704 is to be added to the moving map 700. In the moving map 700 there are six existing map items, namely, a first map item 708 (labeled Item A), a second map item 712 (labeled Item B), a third map item 716 (labeled Item C), a fourth map item 720 (labeled Item D), a fifth map item 724 (labeled Item E) and a sixth map item 728 (labeled Item F). Each map item also includes a snap distance 732.

A map item control (e.g., the map item control 144 of FIG. 1) calculates a binding strength 736 between the map item 704 and the first map item 708, the second map item 712, the third map item 716, the fourth map item 720, the fifth map item 724 and the sixth map item 728. The binding strength is set to 0.0 for each map item that has a distance between the map item 704 greater than the snap distance 732. Thus, the binding strength 736 between the map item 704 and the first map item 708, the third map item 716, the fifth map item 724 and the sixth map item 728 is set to 0.0. Conversely, the map item control assigns a positive binding strength 736 between the map item 704 and the second map item 712 and the fourth map item 720 because the map item 704 is within the snap distance 732 of the second map item 712 and the fourth map item 720. The binding strength 736 is inversely proportional to the distance between the map item 704 and other map items. That is, the shorter the distance between the map item 704 and the other map items, such as the second map item 712 and the fourth map item 720, the greater the binding strength 736. Thus, the map item 704 (Item G) has a larger binding strength 736 (0.621) for the fourth map item 720 (Item D) than the binding strength 736 (0.565) for the second map item 712 (Item B).

Thus, in an example where the map item 704 (Item G) has a lower or equal importance to the fourth map item 720 (Item D), a cluster that includes the fourth map item 720 and the map item 704 is formed with the fourth map item 720 being the top-item and the map item 704 being a hidden-item. Conversely, in situations where the map item 704 has a greater importance than the fourth map item 720, a cluster is formed with the map item 704 and the fourth map item 720 with the map item 704 being the top-item and the map item 720 being a hidden-item.

Referring back to FIG. 1, by implementing the map system 100 a moving map is output on the display 108 that includes clusters of map items. As discussed, calculations related to the clusters of map items is relatively computationally inexpensive, such that the moving map can be fluidly output without bogging down the map server 104. Additionally, by organizing map items (e.g., icons an corresponding descriptors) as described herein, unneeded changes (e.g., unneeded breaking of clusters) is curtailed, thereby improving the overall user (e.g., pilot or driver of the vehicle 102) experience.

In view of the foregoing structural and functional features described above, an example method will be better appreciated with reference to FIGS. 8-12. While, for purposes of simplicity of explanation, the example method of FIGS. 8-12 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

Figure 8:
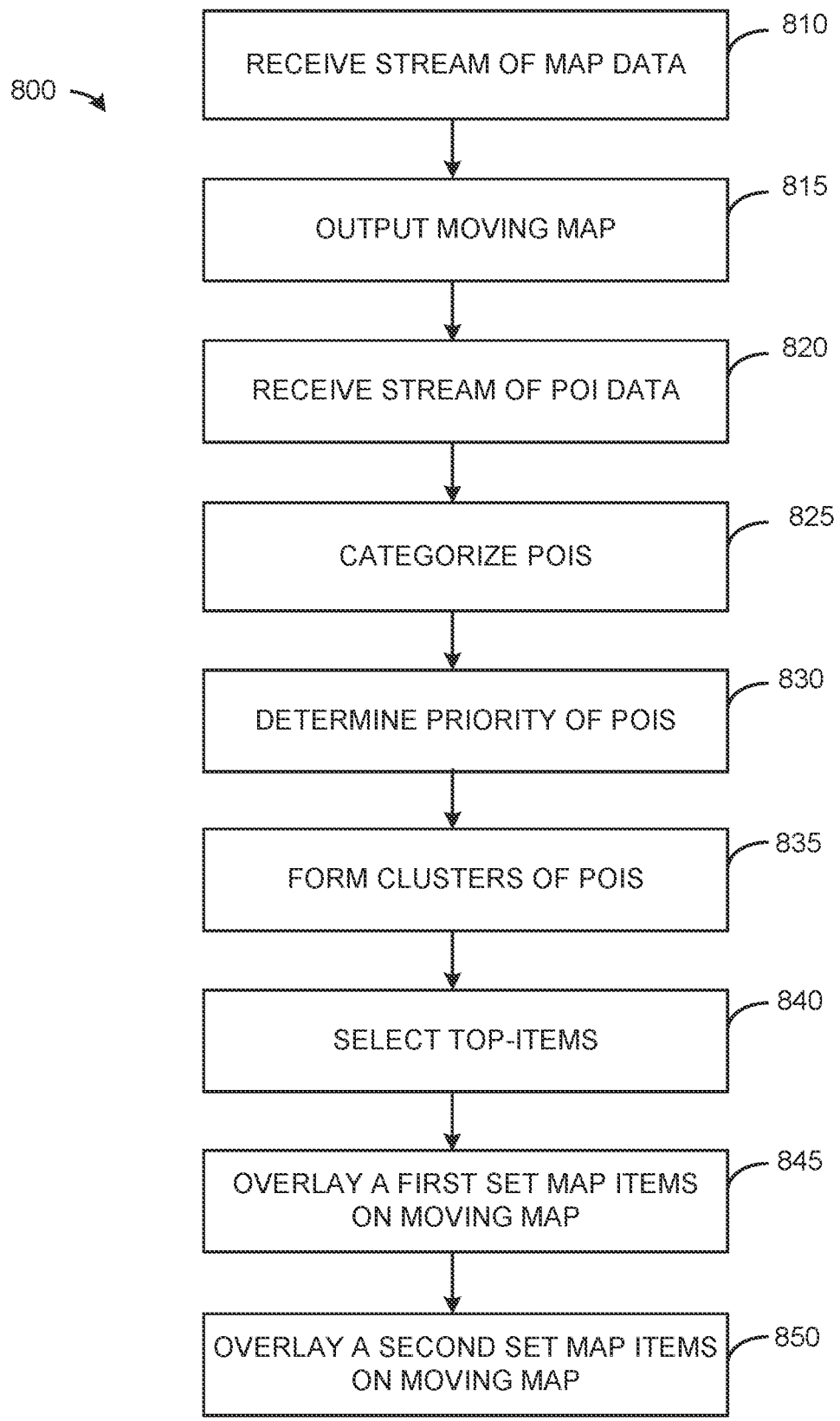
FIG. 8 illustrates a flowchart of an example method for outputting a moving map and for controlling map items on the moving map.

FIG. 8 illustrates a flowchart of an example method 800 for outputting a moving map and for controlling map items on the moving map. The method 800 can be executed by a computing platform, such as the map server 104 of FIG. 1. At 810, a map control module (e.g., the map control module 140 of FIG. 1) of the map server receives a stream of map data characterizing a geographic region proximal to a vehicle (e.g., the vehicle 102 of FIG. 1). The stream of map data can be provided from external data sources (e.g., the R number of data sources 120 of FIG. 1) and/or sensors on the vehicle (e.g., the G number of sensors 124 of FIG. 1). At 815 a moving map is output on a display (e.g., the display 108 of FIG. 1). The moving map can be, for example similar to the moving map depicted in the screenshot 200. In various examples, the moving map can be a 2D map (e.g., an overhead view) or a 3D map (e.g., a first person perspective). The moving map is confined by a boundary of the display corresponding to a portion of the geographic region that changes as a function of time, and the moving map is divisible into a matrix of cells.

At 820, a map item control (e.g., the map item control 144 of the map server) receives a stream of POI data characterizing a plurality of POIs within the boundary. At 825, the map item control categorizes each of the POIs to define a set of categories. At 830, the map item control determines an importance of each POI within the same category that is positioned within the same cell of the moving map. At 835, the map item control forms a set of clusters of map items, wherein a given cluster of the set of clusters represents POIs that are in a same cell and a same category, wherein each cluster includes a plurality of POIs. At 840, the map item control selects a top-item for each cluster of the set of clusters. The top-item of each respective cluster of map items corresponds to a POI of the plurality of POIs within the corresponding cluster of map items with a greatest importance. At 845, the map item control overlays a first set of map items for the set of clusters of map items on the moving map. A display location of each map item in the first set of map items is based on a display location of the top-item of each respective cluster of map items. Each map item in the first set of map items includes a cluster tag indicating a number of hidden-items of a respective cluster of map items of the set of clusters of map items. At 850, the map item control overlays a second set of map items on the moving map. Each map item in the second set of map items represents a single POI of the plurality of POIs. That is, each map item in the second set of map items is represented with an icon, a descriptor and does not include a cluster tag.

Figure 9:
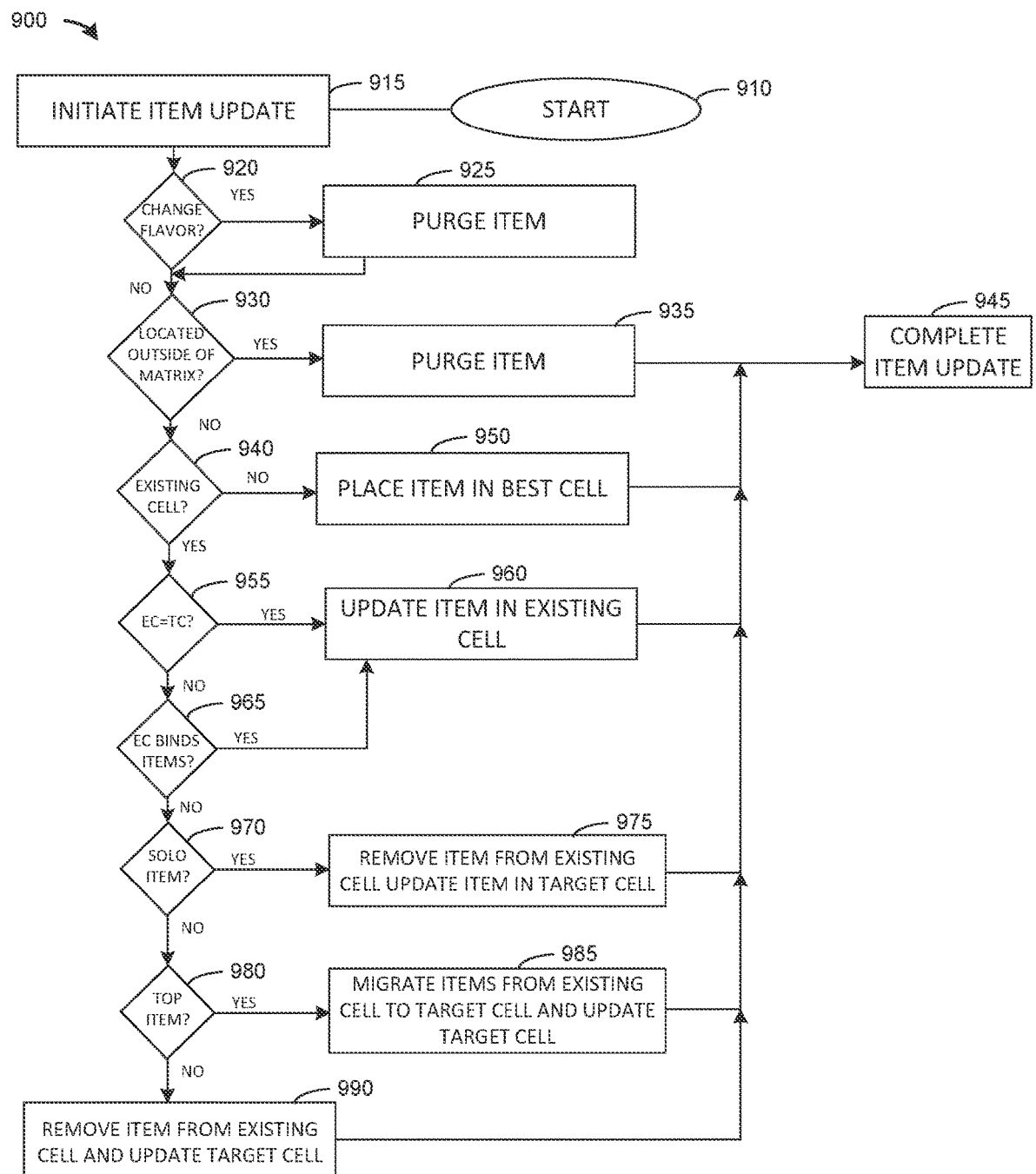
FIG. 9 illustrates a flowchart of an example method for updating a map-item output on a moving map.

FIG. 9 illustrates a flowchart of an example method 900 for updating a map-item output on a moving map. The method 900 can be executed by a computing platform, such as the map server 104 of FIG. 1. At 910, the method 900 begins, and at 915, a map control module (e.g., the map control module 140 of FIG. 1) of the map server initiates an item update.

At 920, a determination is made by the map control module as to whether the map-item has changed flavor (e.g., category). If the determination at 915 is positive (e.g., YES), the method 900 proceeds to 925. If the determination at 915 is negative (e.g. NO) the method 900 proceeds to 930. At 925, the map-item is purged from the map, and the method 900 proceeds to 930.

At 930, a determination is made by the map control module as to whether the screen location of the map-item is outside the bounds of a screen matrix (e.g., a matrix of cells). If the determination at 930 is positive (e.g., YES), the method 900 proceeds to 935. If the determination at 930 is negative (e.g., NO), the method 900 proceeds to 940. At 935, the map-item is purged from the map, and the method 900 proceeds to 945, where the map-item update is completed, and the method 900 ends.

At 940, a determination is made by the map control module as to whether the map-item has an existing cell. If the determination at 940 is negative (e.g., NO), the method 900 proceeds to 950. If the determination at 940 is positive (e.g., YES), the method 900 proceeds to 955. At 950, the map-item is presumed to be a new map-item, and the map-item is placed in the best target cell for the map-item, and the method 900 proceeds to 945. The best target cell for the new item is determined using the operations described with respect to FIG. 7. The best target cell may be a logical target cell, or a neighbor cell if this new map-item is of lesser importance to some neighboring item and is logically bound to the neighbor cell.

At 955, a determination is made by the map control module as to whether the existing cell (EC) for the map-item is a target cell (TC). If the determination at 955 is positive (e.g., YES), the method 900 proceeds to 960. If the determination at 955 is negative (e.g., NO), the method 900 proceeds to 965. At 960, the map-item is updated in the existing cell, and the method 900 proceeds to 945.

At 965, a determination is made by the map control module as to whether the existing cell (EC) for the map-item binds the map-item. If the determination at 965 is positive (e.g., YES), the method 900 proceeds to 960. If the determination at 965 is negative (e.g., NO), the method 900 proceeds to 970.

At 970, a determination is made by the map control module as to whether the map-item is a solo item. If the determination at 970 is positive (e.g., YES), the method 900 proceeds to 975. If the determination at 970 is negative (e.g., NO), the method 900 proceeds to 980. At 975, the map-item is removed from the existing cell and the map-item is updated in the target cell, and the method 900 proceeds to 945. More specifically, because the map-item is a solo-item the existing cell contains only that item, such that the solo-item is migrated to the target cell.

At 980, a determination is made by the map control module as to whether the map-item is a top-item in the existing cell. If the determination at 980 is positive (e.g., YES), the method 900 proceeds to 985. If the determination at 970 is negative (e.g., NO), the method 900 proceeds to 990. At 985, all map-items in the existing cell are moved from the existing cell to the target cell, and the target cell is updated, even in conditions where the items in the existing cell do not belong to the target cell, and the method 900 proceeds to 945. At 990, the map-item is removed from the existing cell and added to the target cell, and the map-item is updated in the target cell, and the method 900 proceeds to 945. More specifically, the map-item being updated is an existing hidden-item whose existing cell is different than the target cell, and the map-item is not bound to the existing cell, such that the map-item is migrated to the target cell.

Figure 10:
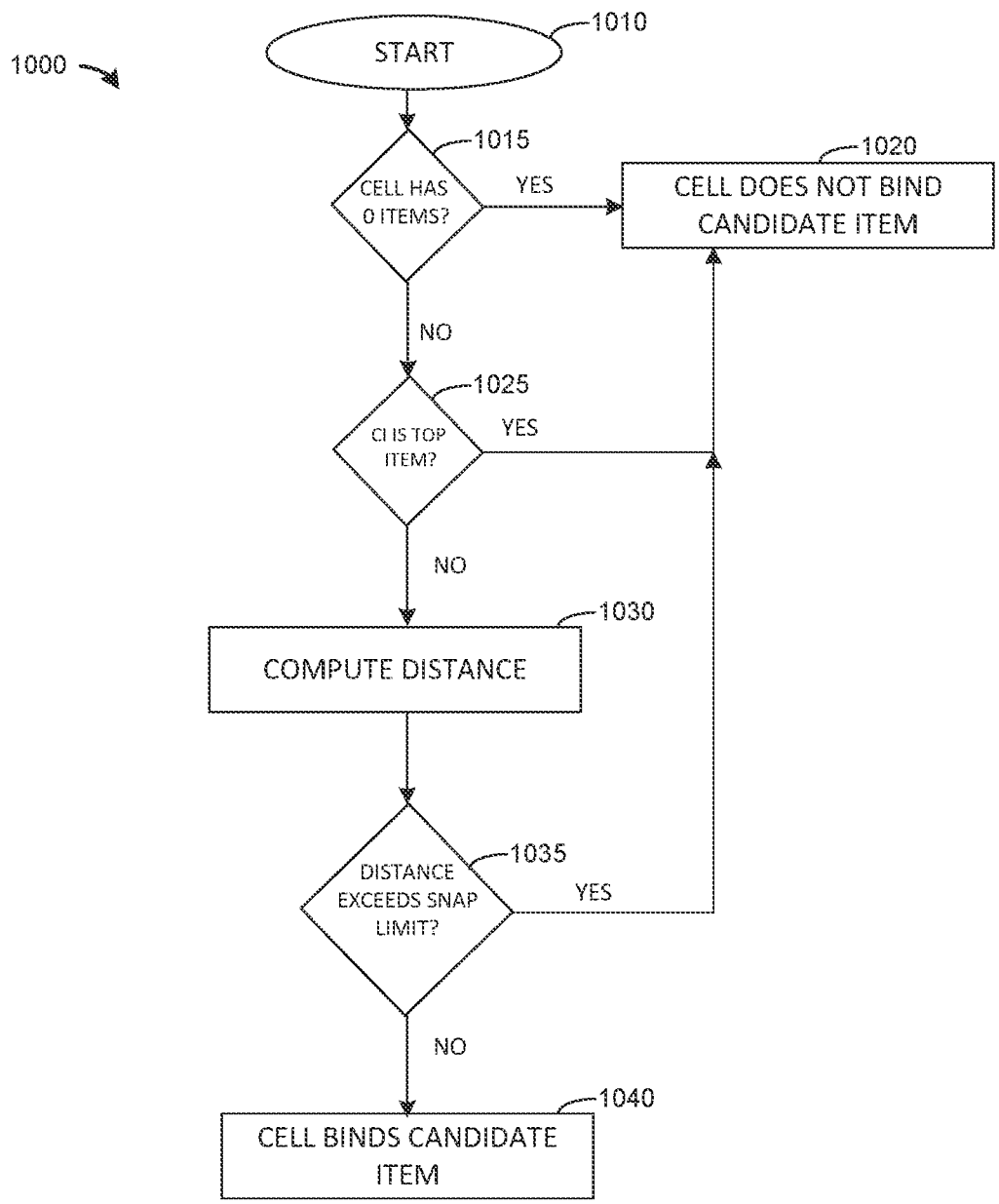
FIG. 10 illustrates a flowchart of an example method showing a logical flow for evaluating whether or not a screen cell can potentially bind a candidate map-item in a moving map.

FIG. 10 illustrates a flowchart of an example method 1000 showing a logical flow for evaluating whether or not a screen cell (e.g., of a matrix of cells) can potentially bind a candidate map-item in a moving map. The method 1000 can be executed by a computing platform, such as the map server 104 of FIG. 1. At 1010, the method 1000 begins.

At 1015, a map control module (e.g., the map control module 140 of FIG. 1) of the map server determines if the cell has zero (0) items. If the determination at 1015 is positive (e.g., YES), the method 1000 proceeds to 1020. If the determination at 1015 is negative (e.g., NO), the method 1000 proceeds to 1025. At 1020, the cell does not bind the candidate map-item.

At 1025, the map control module determines if the candidate map-item (CI) is a top item. If the determination at 1025 is positive (e.g., YES), the method 1000 proceeds to 1020. If the determination at 1025 is negative (e.g., NO), the method 1000 proceeds to 1030. At 1030, the screen distance between the top-item and the candidate map-item is computed, and the method proceeds to 1035.

At 1035, the map control module determines if the computed distance meets or exceeds a snap limit. If the determination at 1035 is positive (e.g., YES), the method 1000 proceeds to 1020. If the determination at 1035 is negative (e.g., NO), the method 1000 proceeds to 1040. At 1040, the cell binds the candidate map-item. Thus, the candidate map-item is not the top-item in the cell and remains within the snap-limit of the top-item and is therefore bound to the cell.

Figure 11:
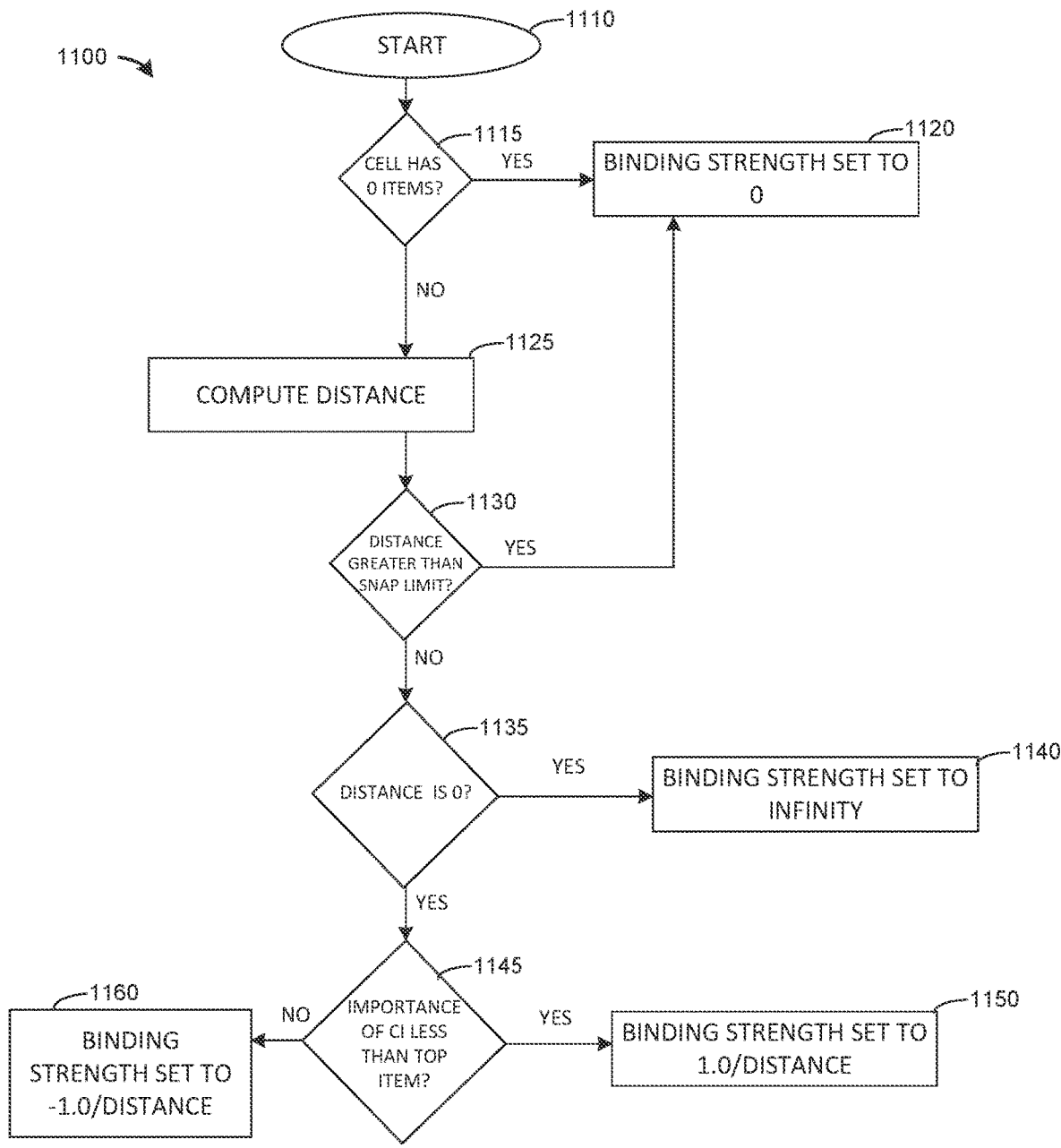
FIG. 11 illustrates a flowchart of an example method showing a logical flow for computing the strength at which a particular screen cell may bind a candidate map-item.

FIG. 11 illustrates a flowchart of an example method 1100 showing a logical flow for computing the strength at which a particular screen cell (e.g., of a matrix of cells) may bind a candidate map-item. The binding strength is analogous to a gravitational pull the cell has on a candidate map-item. The method 1100 can be executed by a computing platform, such as the map server 104 of FIG. 1. At 1110, the method 1100 begins.

At 1115, a map control module (e.g., the map control module 140 of FIG. 1) of the map server determines if the cell has zero (0) items. If the determination at 1115 is positive (e.g., YES), the method 1100 proceeds to 1120. If the determination at 1115 is negative (e.g., NO), the method 1100 proceeds to 1125. At 1120, binding strength is set to zero (0).

At 1125, the map control module computes the screen distance between the top-item and the candidate map-item, and the method proceeds to 1130. At 1130, the map control module determines if the computed distance meets or exceeds a snap limit. If the determination at 1130 is positive (e.g., YES), the method 1100 proceeds to 1120. If the determination at 1130 is negative (e.g., NO), the method 1100 proceeds to 1135.

At 1135, the map control module determines if the computed distance is zero (0). If the determination at 1135 is positive (e.g., YES), the method 1100 proceeds to 1140. If the determination at 1135 is negative (e.g., NO), the method 1100 proceeds to 1145. At 1140, the binding strength is set to infinity (or some arbitrary large number). More generally, if the distance between the candidate map-item and the top-item is zero (0), indicating that the candidate map-item and the top-item are precisely co-located in screen space, the cell has infinite binding strength.

At 1145, the map control module determines if the importance of the candidate map-item (CI) is less than the importance of the top item. If the determination at 1145 is positive (e.g., YES), the method 1100 proceeds to 1150. If the determination at 1145 is negative (e.g., NO), the method 1100 proceeds to 1160. At 1150, the binding strength is set to the reciprocal of the computed distance (e.g., 1/distance). Stated differently, the candidate map-item is of lesser or equal importance than the top-item, and therefore the cell has a binding strength equal to the reciprocal (alternatively referred to as the inverse) of the distance.

At 1160, the binding strength is set to the negative reciprocal of the computed distance (e.g., −1/distance). Stated differently, because the distance between the candidate map-item and the top-item of the cell is less than the snap-limit, and the candidate map-item is of greater importance than the top-item, the cell has a binding strength equal to the negative reciprocal (alternatively referred to as the inverse) of the distance, such that the candidate map-item can become the new top-item and exerts an attractive force on the top-item.

Figure 12:
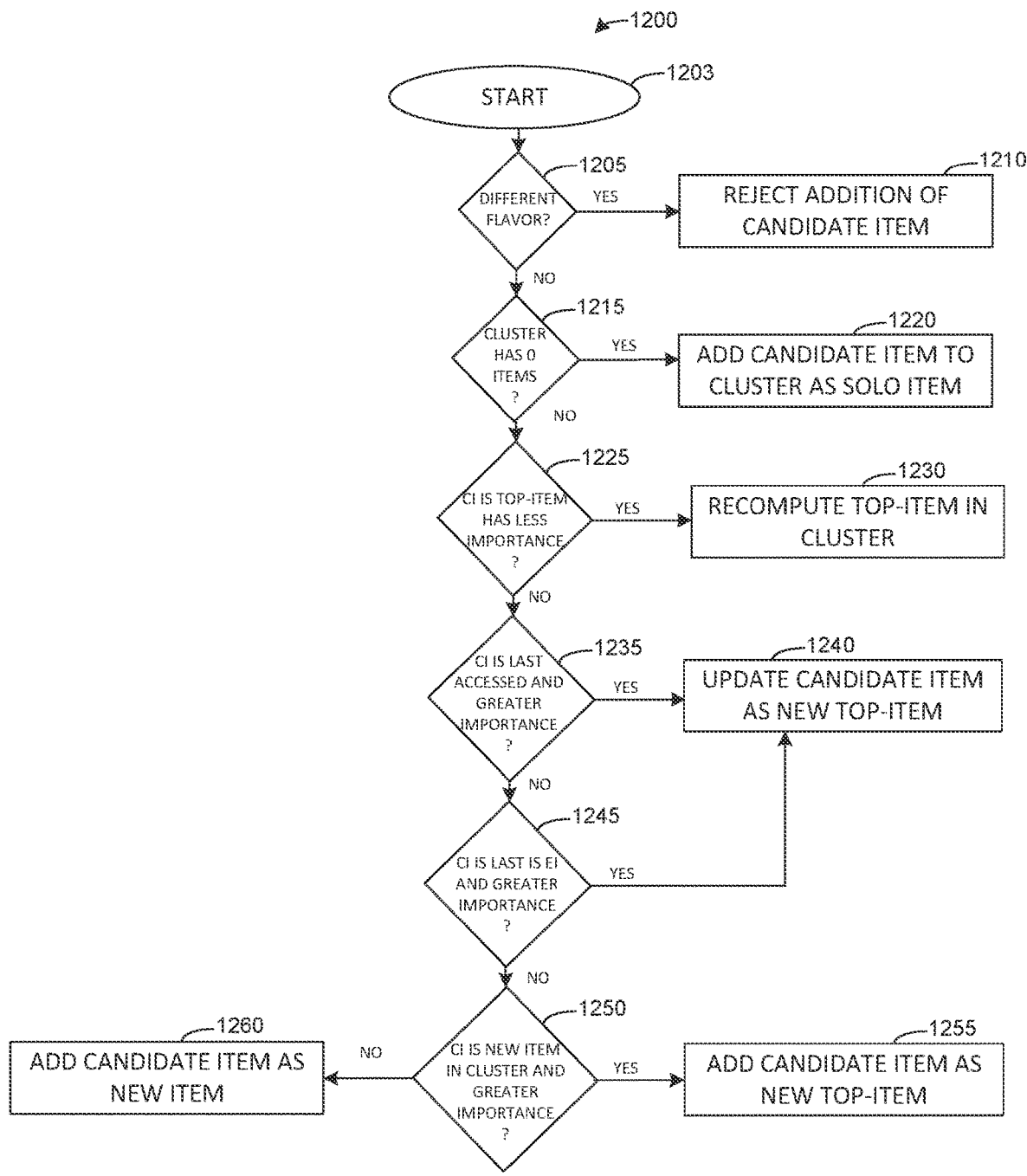
FIG. 12 illustrates a flowchart of an example method showing the logical flow for evaluating the update or addition of a map-item into a cluster.

FIG. 12 illustrates a flowchart of an example method 1200 showing the logical flow for evaluating the update or addition of a map-item into a cluster. This logic flow works even in situations where the cluster is a placeholder containing zero (0) items. The method 1200 can be executed by a computing platform, such as the map server 104 of FIG. 1. At 1203, the method 1200 begins.

At 1205, a map control module (e.g., the map control module 140 of FIG. 1) of the map server determines if the cluster has a flavor different from the flavor of the candidate map-item. If the determination at 1205 is positive (e.g., YES), the method 1200 proceeds to 1210. If the determination at 1205 is negative (e.g., NO), the method 1200 proceeds to 1215. At 1210, the addition of the candidate map-item is rejected for the cluster.

At 1215, the map control module determines if the cluster has zero (0) items. If the determination at 1215 is positive (e.g., YES), the method 1200 proceeds to 1220. If the determination at 1215 is negative (e.g., NO), the method 1200 proceeds to 1225. At 1220, the candidate map-item is added to the cluster as a solo item.

At 1225, the map control module determines if the candidate map-item (CI) has an importance less than a current top-item of the cluster. If the determination at 1225 is positive (e.g., YES), the method 1200 proceeds to 1230. If the determination at 1225 is negative (e.g., NO), the method 1200 proceeds to 1235. At 1230, the top-item in the cluster is recomputed. Re-computation of the top-item in the cluster is executed, which may result in the candidate map-item retaining its position as top-item or one of the hidden-items in the cluster becoming the new top-item.

At 1235, the map control module determines if the candidate map-item (CI) is a last accessed item and the candidate map-item has an importance greater than a current top-item of the cluster. If the determination at 1235 is positive (e.g., YES), the method 1200 proceeds to 1240. If the determination at 1235 is negative (e.g., NO), the method 1200 proceeds to 1245. At 1240, the candidate map-item is updated as the new top-item of the cluster.

At 1245, the map control module determines if the candidate map-item (CI) is an existing item (EI) in a cluster and the candidate map-item has an importance greater than a current top-item of the cluster. If the determination at 1235 is positive (e.g., YES), the method 1200 proceeds to 1240. If the determination at 1245 is negative (e.g., NO), the method 1200 proceeds to 1250.

At 1250, the map control module determines if the candidate map-item (CI) is a new item and the candidate map-item has an importance greater than a current top-item of the cluster. If the determination at 1250 is positive (e.g., YES), the method 1200 proceeds to 1255. If the determination at 1250 is negative (e.g., NO), the method 1200 proceeds to 1260. At 1255, the candidate map-item is added to the cluster as a new top-item. At 1260, the candidate map-item is added to the cluster as a new hidden-item, such that the top-item in the cluster does not change.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine readable medium having machine readable instructions comprising:
   a map control module that:
      receives a stream of map data characterizing a geographic region proximal to a vehicle; and
      outputs a moving map based on the stream of map data on a display, wherein the moving map is confined by a boundary of the display corresponding to a portion of the geographic region that changes as a function of time, wherein the moving map is divisible into a matrix of cells;
a map item control that:
receives a stream of point of interest (POI) data characterizing a plurality of POIs within the boundary;
categorizes each of the plurality of POIs to define a set of categories;
determines a display location of a map item within the matrix of cells for each of the plurality of POIs;
determines an importance for each POI within a same category;
forms a set of clusters of map items, wherein each map item in a given cluster of map items of the set of clusters of map items has a same cell and a same category;
selects a top-item for each cluster of map items having the same category, wherein the top-item of each respective cluster of map items corresponds to a POI of the plurality of POIs within the corresponding cluster of map items with a greatest importance; and
overlays the set of clusters of map items on the moving map, wherein a display location of each cluster of map items in the set of clusters of map items is based on a display location of the top-item of the respective cluster of map items, wherein a display location of a given map item in the set of clusters of map items for a given cluster of map items moves from a first cell to a second cell in response to the stream of POI data indicating that a geographic location of a given POI corresponding to the given map item has changed.

2. The medium of claim 1, wherein each cluster of map item in the set of clusters of map items includes a cluster tag indicating a number of hidden-items within a respective cluster of map items of the set of clusters of map items.

3. The medium of claim 2, wherein the map item control updates the cluster tag associated with the given cluster of map items in response to assigning a new map item to the given cluster of map items and the new map item having an importance less than or equal to an importance of a POI corresponding to the top-item for the given cluster of map items.

4. The medium of claim 1, wherein at least one cluster of the set of clusters represents three or more POIs of the plurality of POIs.

5. The medium of claim 4, wherein the set of clusters of map items are a first set of map items, and the map item cluster control overlays a second set of map items on the moving map, wherein each map item in the second set of map items represents a single POI of the plurality of POIs.

6. The medium of claim 1, wherein a top-item of a first cluster of map items in the set of clusters of map items and a top-item of a second cluster of map items in the set of clusters of map items are overlaid on a same cell of the display, wherein the first cluster of map items corresponds to a first category of the set of categories and the second cluster of map items corresponds to a second category of the set of categories.

7. The medium of claim 1, wherein the map item control removes a hidden-item from the given cluster of map items in response to a display distance between the top-item of the given cluster and the hidden-item of the given cluster being less than a snap distance.

8. The medium of claim 1, wherein the map item control maintains a hidden-item in the given cluster of map items in response to a display distance between the top-item of the given cluster and the hidden-item of the given cluster of map items being less than or equal to a snap distance.

9. The medium of claim 1, wherein the map item control further:
detects a new POI for the plurality of POIs in response to updated POI data;
determines a category, a cell and an importance for the new POI; and
assigns a map item for the new POI to the given cluster of map items, wherein the top-item of the given cluster of map items has a shorter screen distance between the map item for the new POI and a top-item of another cluster of map items of the set of clusters of map items.

10. The medium of claim 1, wherein the map item control changes a display location of the given cluster of map items to a display location associated with a map item for a new POI in response to assigning the map item for the new POI to the given cluster of map items and the new POI having an importance that is greater than an importance of a POI corresponding to the top-item for the given cluster of map items.

11. The medium of claim 1, wherein an update to the stream of POI data causes the map item control to change an importance of a given POI of the plurality of POIs assigned to the given cluster of map items, wherein responsive to the change in importance, the map item control:
changes a display location of the top-item for the given cluster of map items to a display location corresponding to the map item corresponding to the given POI in response to determining that the importance of the given POI is greater than a POI corresponding to the top-item for the given cluster of map items.

12. The medium of claim 1, wherein the vehicle is an aircraft and the moving map is a navigation map for the aircraft.

13. The medium of claim 1, wherein the moving map is a two-dimensional map.

14. The medium of claim 1, wherein the moving map is a three dimensional map.

15. A system comprising:
a memory for storing machine readable instructions; and
a processing unit comprising one or more processor cores that access the memory and executes the machine readable instructions, the machine readable instructions comprising:
a map control module that:
receives a stream of map data characterizing a geographic region proximal to a vehicle;
outputs a moving map based on the map data on a display, wherein the moving map is confined by a boundary of the display corresponding to a portion of the geographic region that changes as a function of time, wherein the moving map is divisible into a matrix of cells; and
receives a stream of point of interest (POI) data characterizing a plurality of POIs within the boundary; and
a map item control that:
categorizes each of the plurality of POIs to define a set of categories;
determines a display location of a map item within the matrix of cells for each of the plurality of POIs;
determines an importance for each POI of the plurality of POIs within a same category;

forms a set of clusters of map items, wherein each map item in a given cluster of map items of the set of clusters of map items has a same cell and a same category;

selects a top-item for each cluster of map items, wherein the top-item of each respective cluster of map items corresponds to a POI of the plurality of POIs within the corresponding cluster of map items with a greatest importance;

overlays a first set of map items for the set of clusters of map items on the moving map, wherein a display location of each map item in the first set of map items is based on a display location of the top-item of each respective cluster of map items, and each map item in the first set of map items includes a cluster tag indicating a number of hidden-items of a respective cluster of map items of the set of clusters of map items, wherein a display location of a given map item in the first set of map items for a given cluster of the set of clusters moves from a first cell to a second cell in response to the stream of POI data indicating that a geographic location of a given POI corresponding to the given map item has changed; and overlays a second set of map items on the moving map, wherein each map item in the second set of map items represents a single POI of the plurality of POIs.

16. The system of claim 15, wherein a first map item in the first set of map items and a second map item in the first set of map items are overlaid on a same cell of the display, wherein the first map item in the set of map items corresponds to a first category of the set of categories and a second map item in the set of map items corresponds to a second category of the set of categories.

17. The system of claim 15, wherein an update to the POI data causes the map item control to change an importance of a given POI of the plurality of POIs assigned to the given cluster of the set of clusters, wherein responsive to the change in importance, the map item control:

changes a display location for the given cluster of map items to a display location corresponding to a map item corresponding to the given POI in response to determining that the importance of the given POI is greater than a POI corresponding to the top-item for the given cluster.

18. A method of clustering map items on a display, the method comprising:

receiving, by a map control module operating on a computing platform, a stream of map data characterizing a geographic region proximal to a vehicle;

outputting, by the map control module, a moving map, based on the map data on a display, wherein the moving map is confined by a boundary of the display corresponding to a portion of the geographic region that changes as a function of time, wherein the moving map is divisible into a matrix of cells;

receiving, by a map item control operating on the computing platform, a stream of point of interest (POI) data characterizing a plurality of POIs within the boundary;

categorizing, by the map item control, each of the plurality of POIs to define a set of categories;

determining, by the map item control, an importance for each of the plurality of POIs within a same category;

forming, by the map item control, a set of clusters of map items, wherein each map item in a given cluster of map items of the set of clusters of map items has a same cell and a same category;

selecting, by the map item control, a top-item for each cluster of map items, wherein the top-item of each respective cluster of map items corresponds to a POI of the plurality of POIs within the corresponding cluster of map items with a greatest importance;

overlaying, by the map item control, a first set of map items for the set of clusters of map items on the moving map, wherein a display location of each map item in the first set of map items is based on a display location of the top-item of each respective cluster of map items, and each map item in the first set of map items includes a cluster tag indicating a number of hidden-items of a respective cluster of map items of the set of clusters of map items; and overlays, by the map item control, a second set of map items on the moving map, wherein each map item in the second set of map items represents a single POI of the plurality of POIs, wherein a display location of a given map item in the first set of map items for a given cluster of the set of clusters moves from a first cell to a second cell in response to the stream of POI data indicating that a geographic location of a given POI corresponding to the given map item has changed.

* * * * *